United States Patent [19]
Simonsen

[11] 3,732,971
[45] May 15, 1973

[54] CONVEYING SYSTEM FOR USE IN SMOKE HOUSES AND THE LIKE

[76] Inventor: Knud Simonsen, 25 West Dean Valley Road, Islington, Ontario, Canada

[22] Filed: May 17, 1971

[21] Appl. No.: 143,780

Related U.S. Application Data

[63] Continuation-in-part of Ser. No. 753,547, Aug. 19, 1968.

[52] U.S. Cl. ............................................198/177 R
[51] Int. Cl. ..............................................B65g 17/20
[58] Field of Search .....................198/20, 177 R; 226/104, 105; 17/44, 44.2, 44.4

[56] References Cited
UNITED STATES PATENTS
3,563,363  2/1971  Harben.............................198/177 R Primary Examiner—Edward A. Sroka
Attorney—George A. Rolston

[57] ABSTRACT

An apparatus for use in the processing of sausage products, such as wieners, comprises an overhead conveyor rail having a series of interconnected trolley units travelling thereon. Elongated sausage-supporting structures are releasably suspended on hangers carried by the trolley units for passage through sausage treatment stations with the sausage-supporting structures disposed generally horizontally with a continuous length of linked sausage product festooned thereover. A discharge actuating mechanism at an unloading station is operative to unlatch one end of the supporting structure from its hanger to allow that structure to pivot downwardly in turn to allow the sausage products to slide off.

11 Claims, 6 Drawing Figures

INVENTOR.
KNUD SIMONSEN
BY:
George A. Rolston

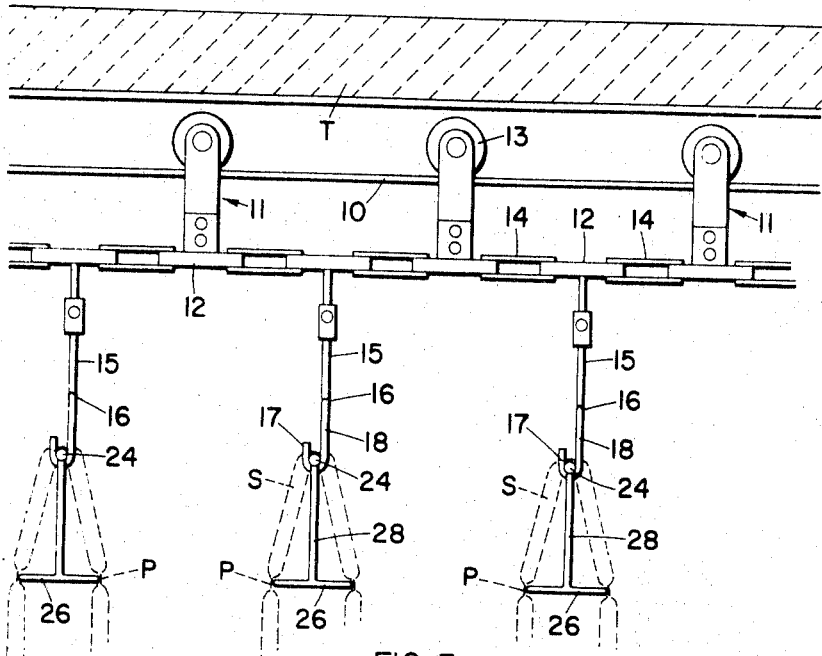
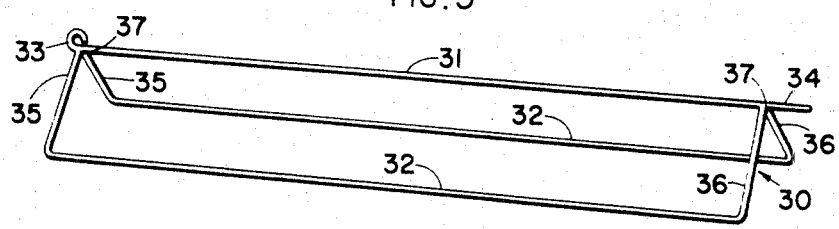
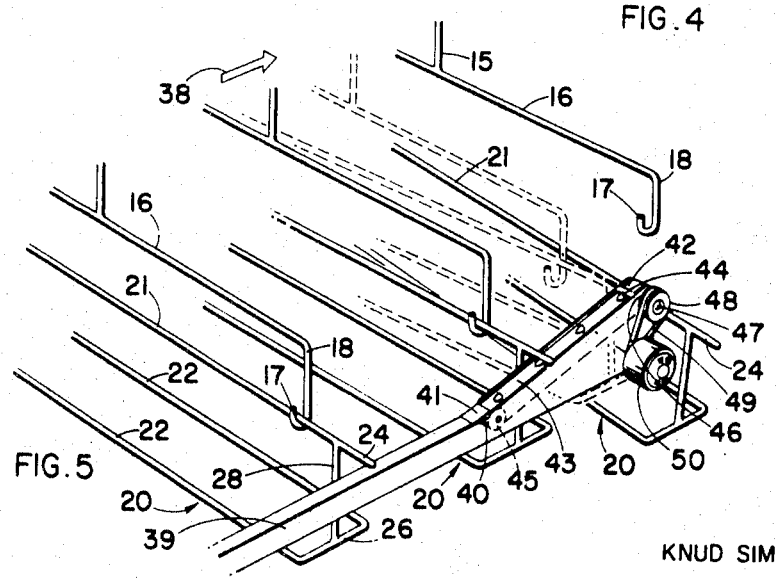

CONVEYING SYSTEM FOR USE IN SMOKE HOUSES AND THE LIKE

CROSS REFERENCE TO RELATED APPLICATION

This is a continuation-in-part application of my co-pending application Ser. No. 753,547, filed Aug. 19, 1968.

BACKGROUND OF THE INVENTION

This invention relates to apparatus for curing sausage products and the like during processing, and particularly during passage through a smoke house and through a subsequent chilling zone.

The production of smoked sausage products such as wieners and the like according to one particularly preferred form of processing is described in U.S. Pat. No. 3,113,870, and the smoke house and chilling apparatus is described in U.S. Pat. No. 2,973,277. As stated in those two patents, the sausages are produced in a machine known as a stuffer which forces ground meat into continuous lengths of sausage casing, and twists the casing approximately every 5 inches to form a separate sausage. Typically such casings are supplied in lengths of 84 feet, 90 feet, 100 feet and even longer in some cases. According to the process and apparatus described in the aforesaid patents, the linked strands of wieners or sausages are supported on sticks passing through the successive loops of the length, the sticks being supported at either end on parallel spaced apart conveyor means which operate at a slow speed to move the sausages through the smoke house. After passage through the smoke house, they then pass through a chilling zone and finally to an unloading zone, at which they are removed from the conveyor for further processing.

The processes and apparatus described in the aforesaid patents, while being a considerable advance over prior art batch processes, involved two serious disadvantages. In the first place, the use of parallel spaced apart conveyors such as moving chains and the like made it impossible for the conveyor system to turn corners as well as making it extremely difficult to arrange the system in an inclined manner. As a result, the conveyor system was usually arranged in a straight line and at a height which caused workers substantial difficulties in loading and removing the already loaded sticks of wieners. For this reason, the shortest casing lengths, in the region of 84 feet, were generally regarded as the maximum length which could conveniently be loaded and unloaded by one person on that type of apparatus. As a result, the more economical longer casing lengths could not easily be used on that type of continuous apparatus. In addition, the use of such a conveyor system in a straight line made it necessary to build a smoke house and a chilling zone in one line thereby leading to highly uneconomical use of available space.

A further disadvantage arising from the known use of sticks for supporting the successive loops of sausages was the fact that, where the two sausages adjacent to each side of the stick in each loop contacted the stick, an unsightly white blemish was left after processing which detracted from the appearance of the end product and led to a certain degree of wastage. However, this marking of the sausages was generally regarded as unavoidable since the stick had to be made a certain width sufficient to maintain the coils of wieners separated from one another; otherwise the successive loops tended to wind around each other, causing blemishes to occur wherever they were in contact with one another.

One attempt to overcome some of these known disadvantages is shown in U.S. Pat. No. 3,024,844 granted to C. H. Wallis, Sept. 7, 1965. In the disclosure of that patent, use is made of a single rail conveyor from which T-shaped support bars are suspended, the linked sausages being festooned or hung from the support members in a continuous manner by means of a special loading machine adapted to feed six columns of linked sausages simultaneously side by side in parallel lines. That procedure overcame the problem of the sausages twisting when supported in the smoke house and also solved the problem relating to the conveyor rail system, since when using a single rail conveyor, the rail could than be arranged to traverse corners and go up and down inclines without difficulty, thereby enabling the smoke house to be arranged in two sections side by side with one another for example, and the chilling zone to be arranged in a third section alongside the smoke house. However, this system involved very considerable additional capital outlay, and also involved the use of additional supervisory personnel both for feeding the sausages into the loading machine, and also for supervising the loading of the sausages onto the separate hangers, the speed of movement of the conveyor system having then to be critically matched to the speed of the loading machine at all times.

SUMMARY OF THE INVENTION

To avoid the disadvantages of the process and apparatus described in U.S. Pat. No. 2,973,277, and this without incurring the extra capital expense required to build and operate the equipment described in U.S. Pat. No. 3,204,844, Applicant has now provided an apparatus for the treatment of sausage products in a processing line and which apparatus includes a discharge-actuating mechanism for automatically effecting unloading of lengths of sausage products at an unloading station. For this purpose, lengths of sausage product are carried by elongated sausage-supporting structures which are releasably carried through sausage treatment stations suspended from hangers which are in turn carried by individual trolley units supported on an overhead monorail conveyor for movement therealong.

It is another objective of this invention to provide a supporting structure particularly suited for the suspended support of sausage products in the apparatus of the invention. Such a supporting structure includes support means and spacer means so permitting the sausage product to be arranged thereon by hand and suspended without contact of one sausage section with another during processing.

More particularly, it is an objective of the invention to provide a supporting structure for use in the apparatus thereof and which structure is particularly adapted for use in association with a sausage-making machine of the type used for producing skinless sausages and in which the sausages are produced joined together in a continuous casing of predetermined length, the linked sausages then being festooned on a rack forming part of the machine, from which they can then be transferred by hand onto the apparatus according to the invention.

More particularly, it is an objective of the present invention to provide an apparatus including a support structure having the foregoing advantages and which incorporates a support means, spacer means for maintaining the loops of linked sausage products apart from one another, and hanger means adapting the same to be hung from the monorail conveyor.

BRIEF DESCRIPTION OF THE DRAWINGS

The foregoing and other advantages will become apparent from the following description of the invention which is given here by way of example only with reference to the accompanying drawings in which like references numerals refer to like parts throughout the various views and diagrams and in which:

FIG. 3 is a greatly enlarged end elevation showing three such sausage support structures as shown in FIGS. 1 and 2, with the roof of the processing zone shown in section, as well as showing the monorail conveyor system in side elevation;

FIG. 4 is a perspective illustration of a further type of sausage-supporting structure for use in the apparatus of the invention;

FIG. 5 is a schematic perspective illustration showing the manner in which the invention provides for the automatic unloading of sausage products from the support structure at an unloading station.

DESCRIPTION OF THE PREFERRED EMBODIMENT

Figure 1:
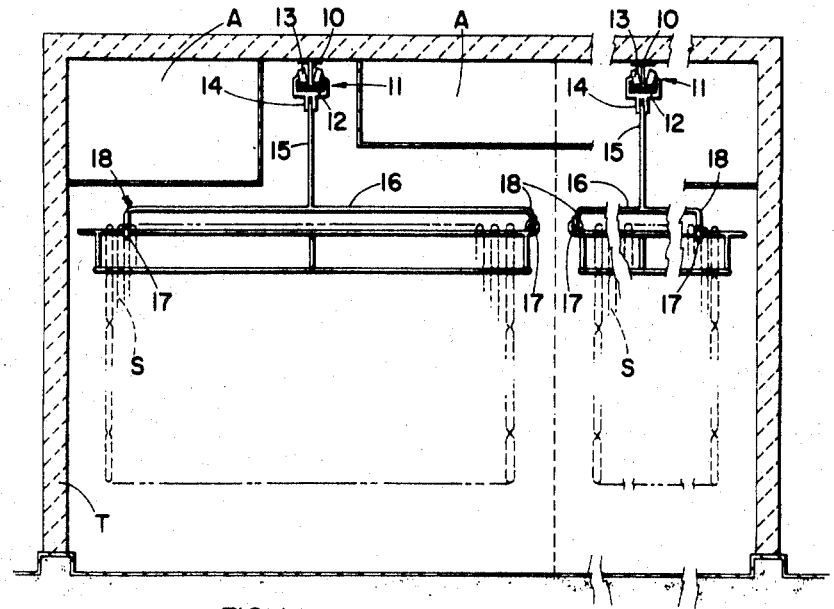
FIG. 1 is a schematic illustration of a processing zone (shown in section) such as a smoke house, and showing the apparatus of the invention with sausage products shown in phantom supported thereon.

The manufacture and general processing details of sausage products such as skinless wieners and frankfurters is fully described in the issued patent already referred to. As stated, the sausages are manufactures in a machine known as a "stuffer" which continuously forces ground meat into a continuous casing, and twists the casing approximately every 5 inches or so thereby forming a continuous string of sausages linked together. The string of sausages is fed from the "stuffer" onto a moving support device incorporating a plurality of hooks, and is formed into a series of loops with the apex of each loop supported on a separate hook until the entire 84 foot length of casing, formed into linked sausages, is supported on the supporting device. The manufacture and operation of the stuffer and the supporting device accompanying it, form no part of this invention, this piece of equipment being a commercial unit now available on the market, one model manufactured by Townsend Engineering Company of Des Moines, Iowa, being one particularly suitable form of this type of apparatus, although there are others available. In some cases two or more stuffers may be used to supply a single smoke house for faster operation.

As stated, the sausage-supporting structure usefully used in the apparatus according to the invention is employed in order to collect each completed length of linked sausages from the stuffer and to transfer it by hand to the processing system, as well as to support such sausages during processing. For the purposes of this description, the processing system is shown schematically as a tunnel of rectangular shaped cross section indicated as T. Suitable hot air and return air ducts indicated generally as A are arranged for the maintenance of the stable processing temperature and humidity which may be varied and controlled by means (not shown) so as to perform any desired processing sequence as, for example, is described in the granted patents referred to.

Within the tunnel T, a continuous monorail 10 is provided running down one side and up the other with a U-shaped return at one end thereby permitting more efficient and economical use of space, and permitting a higher processing speed to be maintained. The monorail 10 will of course continue through a chiller, unloading zone, washer and any other desired operation, and back through the stuffer, these details being omitted for the sake of clarity.

Running on the monorail 10 are a series of trolley units indicated generally at 11 and each having a yoke 12 and rollers 13. A continuous rivetless chain 14 is connected to each yoke 12 and is driven by any suitable motor means (not shown).

Depending from each such trolley unit 11 is a generally inverted T-shaped hanger member having a central stem 15 and a rigid cross bar 16 welded thereto. At each end of cross bar 16, a hook member 17 is provided at the end of a downwardly angled arm portion 18 thereby spacing hook member 17 a substantial distance below cross bar 16 in order to permit ample clearance therebetween.

Figure 2:
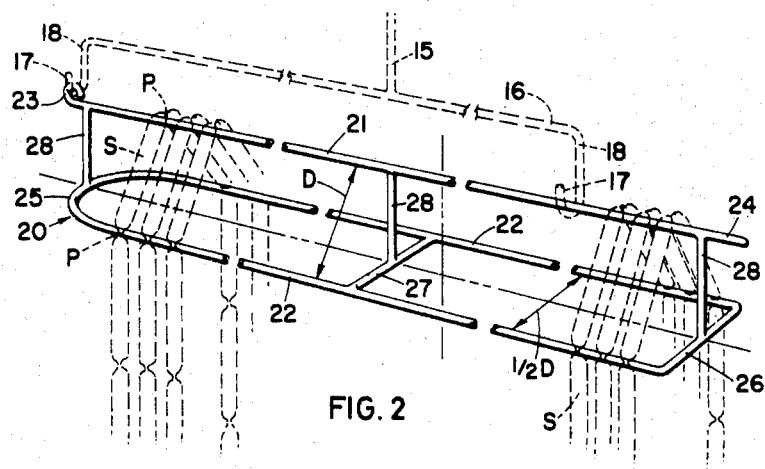
FIG. 2 is a cut away perspective illustration of a sausage support structure as shown in FIG. 1, with a hanger member shown in phantom connected thereto and with sausage products in phantom supported thereon.

The sausage-support structure used in the apparatus according to the invention and referred to generally as 20 is shown in greater detail in FIG. 2, and will be seen to comprise an upper supporting rail 21 of a length greater than the spacing between the two hook portions 17, and two lower spacer rails 22, having a length slightly less than the length of the upper rail 21. Upper rail 21 is provided at one end with an eye 23 arranged and oriented in a substantially vertical plane, and aligned with the axis of rail 21 for reception of one of hooks 17 therein, and is provided at the other end with an endwise extension 24 the purpose of which is to assist in unloading in accordance with this invention in a manner to be described later herein. The two lower spacer rails 22 are joined together at one end to form a rounded U-shaped configuration indicated as 25, at the end adjacent to the eye 23 of upper support rail 21 and, at their other ends, they are joined by a transverse junction member 26. An additional intermediate junction member or strut 27 is provided intermediate the two ends. Three supporting stem members 28 are connected between upper support rail 21 and lower spacer rail 22, being connected thereto at the U-shaped member 25 and at transverse members 26 and 27 respectively thereby to locate the lower spacer rails 22 a predetermined distance below the upper support rail 21. As shown in FIG. 2, the spacing between the upper support rail and each of lower spacer rails 22 is equal to the length (D) of a sausage thereby to ensure that when the continuous linked sausages are arranged in a festoon as in FIG. 2, the upper support rail 21 engages the twisted casing portion P between two sausages and each of the lower spacer rails 22 engages the twisted casing portion P between two sausages, such distance preferably being, therefore, equal to the length D of one sausage as shown. In addition, in order to ensure that the coils of sausages do not become twisted on one another and contact one another during processing, the spacer rails 22 are spaced apart from one another a distance which is equal to between about one-quarter and one-half of D.

An alternate construction for a sausage-supporting structure for use in the apparatus of the invention is shown at 30 in FIG. 4. That structure comprises an upper supporting rail 31 of a length greater than the spacing between the two hook portions 17, and two lower spacing rails 32, having a length slightly less than the length of the upper rail 31. Upper rail 31 is provided at one end with an eye 33 arranged and oriented in a substantially vertical plane, and aligned with the axis of rail 31 for reception of one of the hooks 17 therein and, at the other end, with an endwise extension 34 the purpose of which is to assist in unloading in a manner to be described later herein. Each of the two lower spacer rails 32 is joined to the upper rail 31 by two supporting stem members 35 and 36. The supporting stem members 35 and 36 are merely endwise extensions of the ends of the lower spacer rails 32 and are welded to the upper rail 31 at weld spots 37. The lower spacer rails 32 are located again a predetermined distance D from the upper support rail 31 and are spaced apart a distance between about one-quarter and one-half D.

An unloading station is shown in FIG. 5, where the monorail 10 moves in the direction shown by arrow 38. On the side opposite the eye 23, parallel to the path of travel shown by arrow 38, there is a bar 39 having a rectangular cross section which extends from any suitable support (not shown) in the direction of the arrow 38. At the free end of the bar 39, there is an extended wedge-shaped arm 40 having a top surface 41 which diverges upwardly from the top surface of the bar 39. Positioned adjacent to the upper surface 41, there is an endless conveyor belt 42 moving generally in the direction of the arrow 38. The belt 42 has an outer surface 43 with a number of projections 44 thereon. Belt 42 passes around a lower rotatable pulley 45 adjacent the arm 40 and around a driven pulley 46 which is connected on an axle 47 to which there is also secured a sprocket 48. An endless chain drive means 49 is connected between the sprocket 48 and a drive sprocket (not shown) on an electric motor 50. The chain drive means 49 drives the sprocket 48 and the conveyor belt 42 in the direction shown by the arrow 38.

In operation, as the "stuffer" (not shown) forms the casings into individual uncured sausage sections S which remain connected in continuous end-to-end relationship by the twisted casing portions P, the string of sausages is fed onto a moving hook support device (not shown) as previously described. The lengths of sausage sections S are then hanging in loops of a convenient length and the support structure 20 is then passed by hand into one end of the series of loops of sausages until the eye 23 extends from the other end, the U-shaped end 25 facilitating the introduction thereof between such loops. The support structure 20 is then raised by hand in an upward direction so that the upper support rail 21 engages each of the loops of sausage sections at the upper twisted portions P thereby lifting them clear of the hooks of the hook support device (not shown). The loops of sausages are then supported on the sausage support structure 20, and the twisted portions P at the lower ends of each pair of upper sausages are engaged by respective spacer rails 22.

At the loading station, the monorail 10 is arranged at a reduced height so that the cross bar 16 passes the person loading the festooned sausages on the support structure 20 onto the cross bar 16 at approximately shoulder height. This is preferred as the person at the loading station will not then have to raise the string of sausages and the support structure 20 to any considerable height. The support structure 20 is connected to the cross bar 16 by placing the eye 23 on one of the hook members 17 of the arm portion 18 and the other hook member 17 is then engaged under the support rail 21 near the other end of that rail. The speed at which the trolley units 11 move is regulated to the speed at which the festooned string of sausages come out of the stuffing machine (not shown) and at which they can be placed on the support structure 20 and at which the loaded structure can be hung on the cross bar 16. On moving along the monorail 10, the support structure 20 carries the sausage sections S in substantial vertical dependent disposition with the upper twisted casing portion P on the upper support rail 21 and the two lower support rails 22 contacting and separating the lower portions. The sausage sections S are not in contact with the support rail 21 or spacer rails 22 so that no marks are left on the sausage sections S.

The monorail 10 carries the support structure 20 through the different stages of the process where the sausages are fully cooked, smoked and cooled, and the sausages are then taken off the support structure 20 at an unloading station. The construction of the support structure 20 permits an automatic unloading of the sausages from the support structure 20 at the unloading section as shown in FIG. 5. The support structure 20 is moving in the direction shown by the arrow 38 and the endwise extension 24 of each of the upper support rails 21 engages the upper surface 41 of the extension arm 40. The yoke 12 is pivoted rearwardly slightly but the weight of the festooned sausages and the support structure 20 prevents the cross bar 16 from being pivoted too far rearwardly. The endwise extension 24 of the upper support rail 21 rides on the supper surface 41 and comes into contact with the outer surface 43 of the moving conveyor belt 42. The endwise extension 24 is raised upwardly and lifted free of the hook member 17 of the arm portion 18 of the cross bar 16 by engagement of a protrusion 44 of belt 42. The cross bar 16 does not tip as it is securely held against sideways movement by the yoke 12. The endwise extension 24 makes contact with one of the projections 44 on the conveyor belt 42 and is moved to the end of the belt 42 where the endwise extension 24 drops free of the hook member 17 of the cross bar 16. The support structure 20 is connected to the cross bar 16 at the other end by the eye 23 on the hook member 17. When the extension 24 drops clear of the arm portion 18 of the cross bar 16, the string of sausages falls off the support structure 20 onto a loading table (not shown), the eye 23 remaining on the hook member 17 so that the support structure 20 is then carried thereby for any desired subsequent treatment such as sterilization.

It should be noted that the construction of the support structure 20 can be altered, as shown, for example, in FIGS. 2 and 4, without departing from the scope of the invention. The eye 23 or 33 may be easily removed and can be replaced merely by an endwise extension 24 which will permit the support apparatus 20 to be used in the previously known prior art methods of processing sausages. The support structure 30, as shown in FIG. 4, is easily stackable and requires little room for storage until used. The support structure 20 or 30 may be made from stainless steel, aluminum, or good quality steel which will withstand the temperatures and humidity of the process it is involved in. The use of the support structure 20 or 30 in the apparatus of the invention speeds up the loading process so that it is possible to use two or more stuffers at the loading station to feed one smoke house.

It will be understood that, in this particularly preferred embodiment, the support structure 20 is most advantageously constructed with the dimension D corresponding precisely to the length of a sausage section S, thereby ensuring that the support structure performs in the most effective manner. However, in some cases, meat processors will wish to produce sausages of a variety of different lengths to suit different markets. Generally speaking, if the variety of different sausage lengths will be produced in sufficient volume, it will be found to be preferable to provide a supply of support structures such as structure 20 to suit the dimensions of all the varieties of sausage. However, in many cases, the investment so required might be beyond the means of the meat processor and, accordingly, the support structure 20 will be made with the dimension D corresponding to the length of sausage which is produced in the greatest volume. When it is desired to produce sausages of a different length, then the support structure 20 will be used in the same way as described above, that is to say with the twisted portion P at the top of each loop lying over the upper supporting rail 21 or 31, as the case may be, but with the two lower spacer rails 22 contacting the sausage S itself rather than contacting the twisted casing portion P. When operating in this way, it has been found by experience that, due to the smooth rounded configuration of the support rails 22 or 32, the point at which such spacer rails contact the sausages S during processing, is only very slightly marked, so as to be almost indistinguishable.

Figure 6:
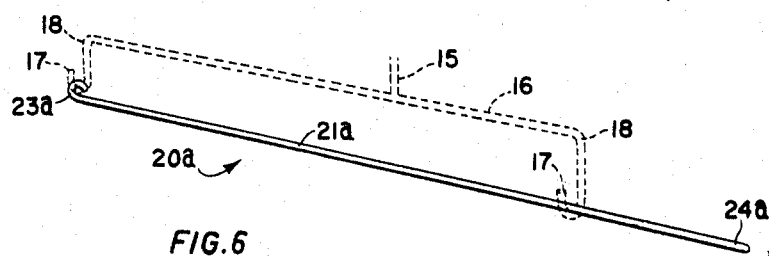
FIG. 6 is a partial perspective illustration of a further embodiment of the invention.

According to a further embodiment illustrated in FIG. 6 the provision may be made for supporting other products in the smoke house such as bacon. In this case the lower spacer rails 22 are unnecessary. All that is required is the support rail 21a with a ring or look 23a at one end and an outwardly extending free end 24a at the other end. The rail 21a is of course of a length greater then the length of the hanger 16 so as to permit automatic unloading as shown in FIG. 5. It will also be understood that while reference has been made to twisted casing portions, the invention is also applicable to sausage lengths which are formed with casings which are tied with cord or twine between each sausage.

What I claim is:

1. An apparatus for the treatment of sausage products in a processing line, said sausage products being linked together in predetermined lengths by portions of casing material between the individual sausages, said apparatus comprising:
   an overhead conveyor rail;
   a series of interconnected trolley units supported on said conveyor rail for movement therealong;
   a plurality of hangers carried by said trolley units;
   a plurality of elongated sausage-supporting structures releasably carried by respective ones of said hangers for releasably receiving loops of sausage products and carrying the same through sausage treatment stations on said processing line, and being swingable relative to said hangers for release of said sausage products therefrom, said stations including an unloading station, with said sausage-supporting structures disposed essentially horizontally with lengths of sausage products festooned thereover; and
   a discharge-actuating mechanism at said unloading station and operative sequentially to effect at least partial disengagement of each said sausage-supporting structure from a respective one of said hangers at said unloading station for the removal therefrom of sausage product carried by that sausage-supporting structure.

2. An apparatus as claimed in claim 1 in which said discharge-actuating mechanism is operative sequentially to effect disengagement of each said sausage-supporting structure from a respective one of said hangers at said unloading station permitting the same to swing relative thereto and thereby allow lengths of sausage product carried by that sausage-supporting structure to fall therefrom.

3. An apparatus as claimed in claim 2 in which each said sausage-supporting structure is pivotally mounted by a pivot means to a respective one of said hangers and is further detachably coupled to that hanger by a releasable coupling means spaced apart from said pivot means for movement in an essentially horizontal position thereof through said sausage treatment stations and for downward pivoting movement at said unloading station about said pivot means on operation of said discharge-actuating mechanism to release said releasable coupling means.

4. An apparatus as claimed in claim 3 in which each said pivot means is adapted to permit a respective one of said sausage-supporting structures to be detached completely from a respective one of said hangers.

5. An apparatus as claimed in claim 1 in which said hanger includes a generally horizontal hanger bar and dependent hanger means at each end of said hanger bar for engagement with a respective one of said elongated sausage-supporting structures, at least one of said hanger means being adapted to be uncoupled from that sausage-supporting structure by said discharge-actuating mechanism for the removal therefrom of sausage product carried thereby.

6. An apparatus as claimed in claim 5 in which one of said hanger means on each said hanger bar is pivotally coupled to the respective sausage-supporting structure and in which the other of said hanger means on each said hanger bar comprises an open hook constituting a releasable coupling for suspending a respective one of said sausage-supporting structures in a generally horizontal position thereof.

7. An apparatus as claimed in claim 6 in which each said hanger means includes a hanger stem depending from a respective one of said trolley units and located generally centrally relative to said elongated sausage-supporting structure and in which each said sausage-supporting structure comprises an upper support rail of a predetermined width small enough to fit between the two ends of an adjacent pair of sausage products in a given length, to engage the casing material therebetween and to support the weight of such a length of sausage product, essentially coterminous first and second lower spacer rails generally parallel to each other and to said upper support rail and disposed so as to be generally equidistant and spaced apart on opposite sides from a vertical plane intersecting said upper support rail, and supporting stem members extending from said upper support rail to connect said lower spacer rails thereto, said upper support rail being releasably engaged by said open hook when said sausage-supporting structure is disposed in a generally horizontal position.

8. An apparatus as claimed in claim 7 and including an endwise extension on one end of said upper support rail and in which said discharge-actuating mechanism is operative to engage each said endwise extension at said unloading station to elevate said upper support rail from said hook.

9. An apparatus as claimed in claim 8 in which each said elongated sausage-supporting structure is pivotally connected to said hanger means by an eye-member integrally formed with said upper support rail thereof at an opposite end of said rail to said endwise extension thereof.

10. An apparatus as claimed in claim 9 in which said discharge-actuating mechanism includes a moving belt having an upper reach slopingly disposed for sequential engagement at said unloading station with said endwise extensions of said upper rails of said sausage-supporting structures to lift said rails from said hooks and thereafter to displace said upper support rails transversely relative thereto.

11. An apparatus as claimed in claim 10 in which each said eyelet is releasably engaged by a hook constituting a respective one of said pivot means.

* * * * *